United States Patent [19]

Castelaz

[11] Patent Number: 4,930,099
[45] Date of Patent: May 29, 1990

[54] WAVEFRONT VECTOR CORRELATION PROCESSOR AND METHOD

[75] Inventor: Patrick F. Castelaz, Yorba Linda, Calif.

[73] Assignee: Hughes Aircraft Company, Los Angeles, Calif.

[21] Appl. No.: 255,053

[22] Filed: Oct. 7, 1988

[51] Int. Cl.[5] ............................................. G06G 7/12
[52] U.S. Cl. ................................. 364/820; 364/807; 364/819
[58] Field of Search ............... 364/820, 807, 822, 604, 364/817, 822, 823, 827; 307/20.1, 425

[56] References Cited

U.S. PATENT DOCUMENTS

| | | | |
|---|---|---|---|
| 3,950,733 | 4/1976 | Cooper et al. | 340/172.5 |
| 4,254,474 | 3/1981 | Cooper et al. | 364/900 |
| 4,326,259 | 4/1982 | Cooper et al. | 364/715 |
| 4,450,530 | 5/1984 | Llinas et al. | 364/513 |
| 4,591,980 | 5/1986 | Huberman et al. | 364/200 |
| 4,812,682 | 3/1989 | Holmes | 307/425 |

Primary Examiner—Jerry Smith
Assistant Examiner—Charles B. Meyer

[57] ABSTRACT

A wavefront vector correlation processor provides rapid, weighted correlation of a given vector with other vectors in a given vector space. In one embodiment the processor includes an interconnected two-dimensional array of simple processing elements that is an electronic analogue of the X,Y plane. Each processing element is connected to neighboring processing elements and is capable of transmitting a pulse to its neighboring processing elements in response to an input pulse. An initial pulse initiated at a processing element having a first classification causes electronic ripples to spread out in chain/reaction among neighboring processing elements. When the electronic ripple reaches processing elements having a second classification, a controller circuit senses these events and measures the time between the initial pulse and the detected pulse. This measured time may then be used to provide correlation between the vector of the first classification and vectors having a second classification.

17 Claims, 3 Drawing Sheets

WAVEFRONT VECTOR CORRELATION PROCESSOR AND METHOD

BACKGROUND OF THE INVENTION

1. Technical Field

This invention relates to information processors, and more particularly to an information processor for correlating a given data vector with other data vectors.

2. Discussion

Problems requiring rapid correlation between sets of data vectors are encountered in a number of situations. In particular, such problems involve the rapid estimation of weighted distances between a given two-dimensional data vector and an arbitrary number of other two-dimensional vectors in an arbitrarily large vector space. Such problems are found in tracking problems requiring rapid, massive plot-to-track and/or track-track correlation. Weighted correlation, also called "fuzzy" correlation, of two-dimensional vectors is also required in such areas as real-time, artificial intelligence and robotics. It is known to solve such problems in software on general purpose computers. One disadvantage with software approaches is that they are very slow in applications involving massive real-time correlation problems. For example, software solutions can typically handle only hundreds of vector to vector (non-fuzzy) correlations per second. In some applications it is desirable to perform such correlations much faster than this.

Other potential approaches to correlation problems include systolic and wavefront array architectures. However, such conventional computer architectures are typically directed toward signal processing applications and have not, insofar as applicant is aware, been directed toward the particular problem of two-dimensional vector fuzzy correlation. Furthermore, because these conventional architectures employ relatively complex processing elements that perform arithmetic computations, and because they transfer digital data between the individual processing elements, there are inherent limitations on the speed in which such architectures can solve these problems. In addition, such processors are relatively expensive.

Thus, it would be desirable to provide a processor for providing weighted correlation of data vectors that is faster than previous solutions and is relatively inexpensive to construct.

SUMMARY OF THE INVENTION

Pursuant to the present invention, an information processor is provided that can rapidly perform weighted correlation of data vectors utilizing relatively simple and inexpensive hardware. The processor utilizes a neural network-type architecture having a matrix of simple processing elements. Each processing element is connected to neighboring processing elements and is capable of responding to an input pulse with an output pulse. Also, the processing elements have a memory for storing a classification. The processing elements are disposed in the array in positions that represents points in a vector space. Individual data points having a particular classification are assigned to corresponding points in the array. Each processing element also has an assigned address and may be addressed individually by a controller.

When any individual processing element receives a single input pulse, it responds with a single output pulse that is sent to neighboring connected processing elements. A synchronization means may be connected to the address lines for synchronizing the timing of the transmission of output signals by the processing element so that neighboring processing elements transmit output pulses simultaneously. A detector, connected to the address lines is also provided for detecting when processing elements of a given classification receive pulses from neighboring cells.

In operation, when a single pulse is transmitted to a processing element belonging to a first classification, the processing element transmits single pulses to each of the neighboring connected processing elements simultaneously. Those neighboring processing elements, in turn, transmit single pulses to their neighboring processing elements. Processing elements which have already received pulses will not transmit pulses again when they receive pulses back from subsequently pulsed processing elements.

In this way, the transmission of the initial pulse spreads out symmetrically from the first processing element like a wave. When a processing element having a second classification receives a pulse, the detector measures the time from the initial input pulse until the processing element having the second classification received the pulse. This time can then be used to correlate the two vectors corresponding to the two processing elements. For example, in one embodiment, the correlation represents the spatial distance between the two vectors.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENT

Figure 1:
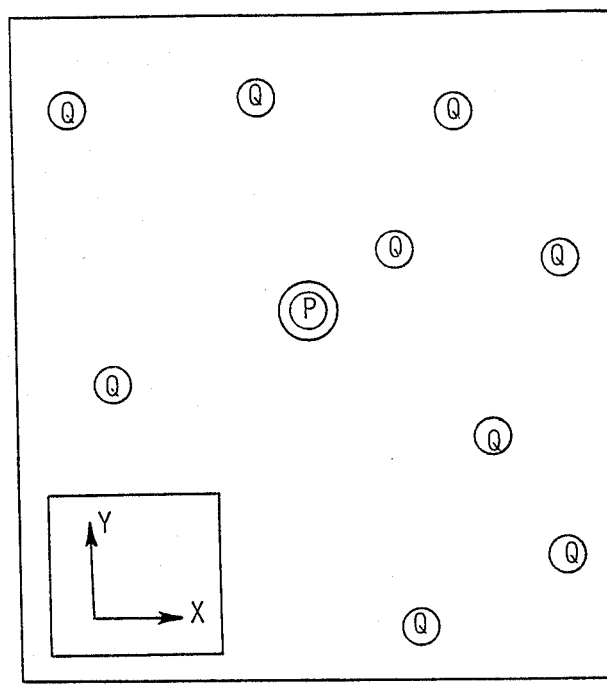
FIG. 1 is a diagram of a two-dimensional vector-to-vector plot-to-track correlation problem in accordance with the preferred embodiment of the present invention.

Referring now to FIG. 1, a diagram of a two-dimensional vector-to-vector correlation problem is shown. A first vector P of a first classification is plotted at a location on an X-Y plane at a location P(x,y). A number of other vectors of a second classification Q are plotted on the X-Y plane at locations Q(x,y). In this problem, the task is to correlate the vector P(x,y) with all other vectors Q(x,y) to produce as an output a correlation factor C(x,y). From the correlation factor C(x,y) a spatial or other correlation may be determined which, for example, may be used to identify which Q(x,y) is nearest to P(x,y). In one application of this type of correlation, such as Air Defense Ground Equipment (ADGE) System, Q(x,y) corresponds to time extrapolated tracks produced by a tracking system, and a P(x,y) corresponds to a given target detection or "plot" from a sensor. The requirement in this problem is to identify the Q(x,y) that is nearest to P(x,y) to accomplish the "plot-to-track" correlation.

Figure 2:
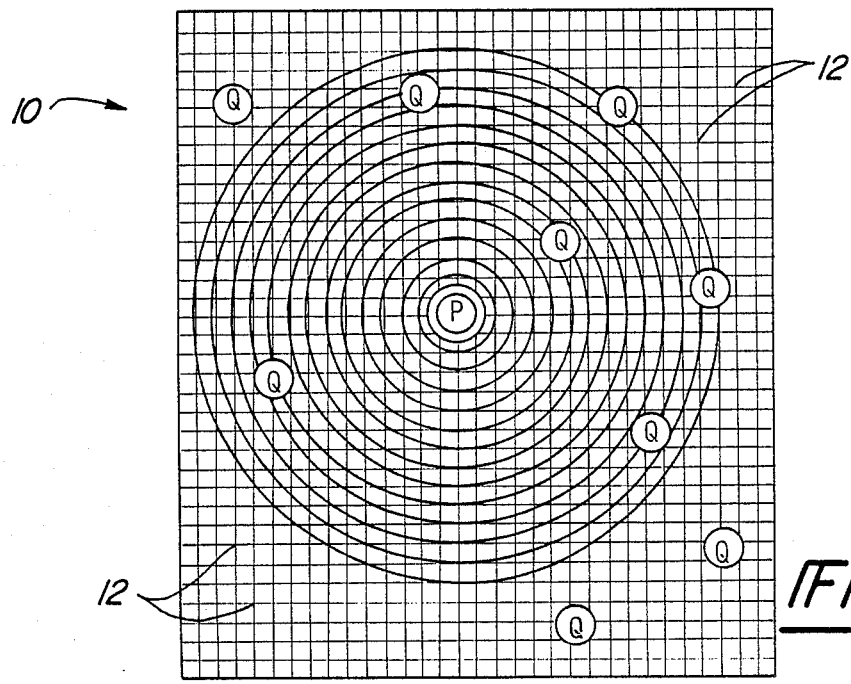
FIG. 2 is a layout of the overall structure of the wavefront vector correlation processor applied to the plot-to-track problem in accordance with the present invention.

In order to accomplish this correlation the present invention provides a wavefront vector correlation processor 10 as shown in FIG. 2. The processor 10 is an electronic analogue of the X-Y plane, with simple processing elements 12 placed at every coordinate. When the processing element 12 located at point P(x,y) is stimulated, it causes electronic "ripples" to spread in chain-reaction fashion among neighboring processing elements 12 as shown by the circular lines 14 in FIG. 2. The vector correlation solution achieved by the processor 10 is analogous to treating P (x,y) as a pebble tossed in a still pond: wave ripple outward from the point of impact, P(x,y), and encounter the objects Q(x,y). The nearest Q(x,y) is encountered first and the furthest Q(x,y) last.

Figure 3:
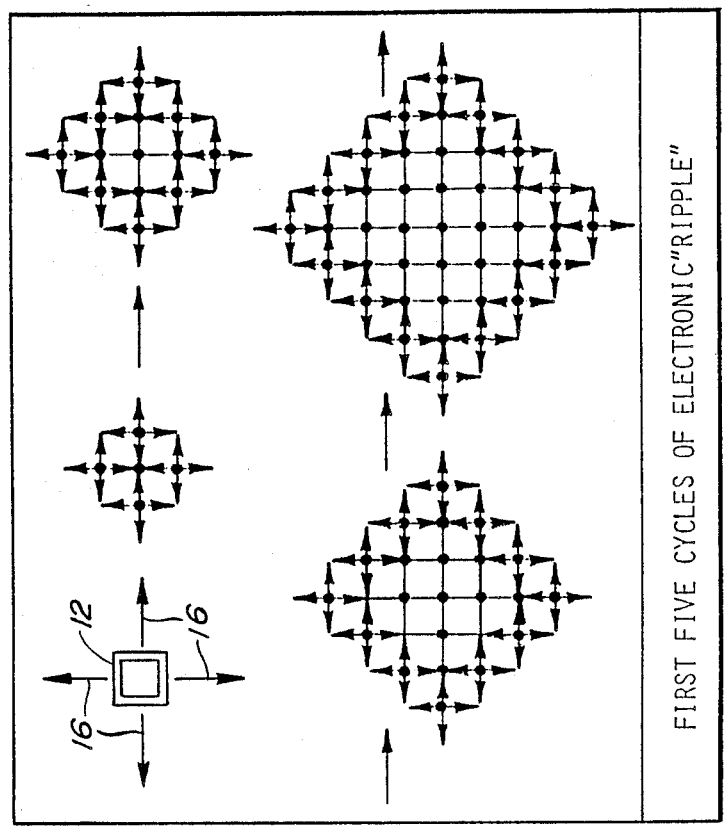
FIG. 3 is a diagram showing the interconnect structure of the wavefront vector correlation processor and propagation of pulses during the first five cycles in accordance with the present invention.

The interconnect structure of the processor 10 is shown in more detail in FIG. 3. The processing element 12 at location P(x,y) is connected to each of its nearest four neighbors by four conductors 16. Each processing element 12 has a memory to indicate that it is a Q(x,y) location and also has the ability to receive P(x,y) and Q(x,y) signals. Each processing element 12 can respond to a received signal with a transmitted signal to all of its connected neighbors, and it is able to transmit only once upon receipt of an input pulse. To permit each processing element to transmit once and only once, the processing element 12 may contain a timing or logic means which prevents a second pulse from being transmitted if a second pulse is received within a given period of time. Alternatively, each processing element 12 may be constructed so that it can only transmit one pulse until it is reset by an external means. The reason for requiring only a single pulse is so that in subsequent cycles, a pulse sent back to the processing element 12 from neighboring processing elements 12 will not cause the original processing element 12 to transmit a second pulse. This is important to achieve the electronic "ripple" as shown in FIG. 2.

In particular, FIG. 3 shows the processing element 12 at P (x,y) in the first cycle transmitting a single pulse in four directions. In the second cycle the four neighboring processing elements 12 each transmit single pulses to neighboring processing elements 12. In the third cycle the eight processing elements surrounding the four processing elements activated in the second cycle transmit pulses. It should be noted that even though the processing element 12 at P(x,y) received pulses during the second cycle it does not transmit a new pulse during the third cycle because of the single pulse requirement. Likewise, the electronic ripple propagates outward from the processing element 12 at point P(x,y) in the fourth, fifth and subsequent cycles.

Figure 4:
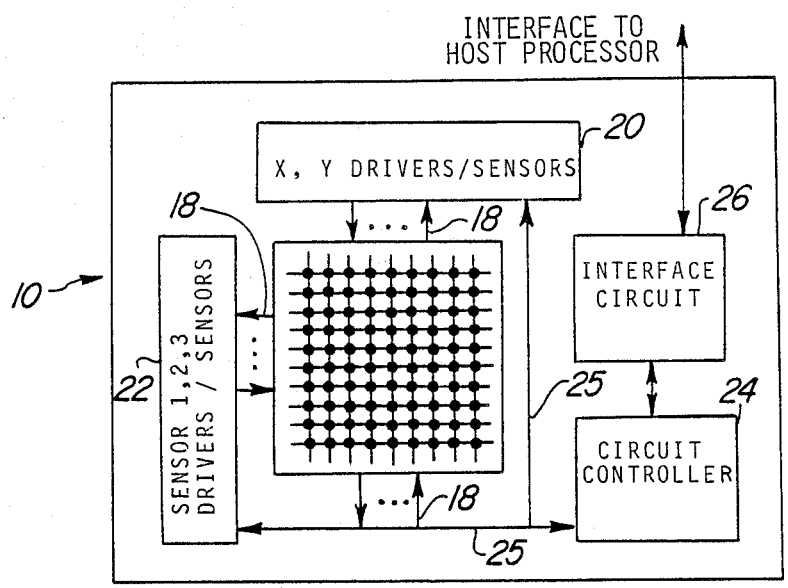
FIG. 4 is a diagram of the board layout of the wavefront vector correlation processor in accordance with the present invention.
Figure 5:
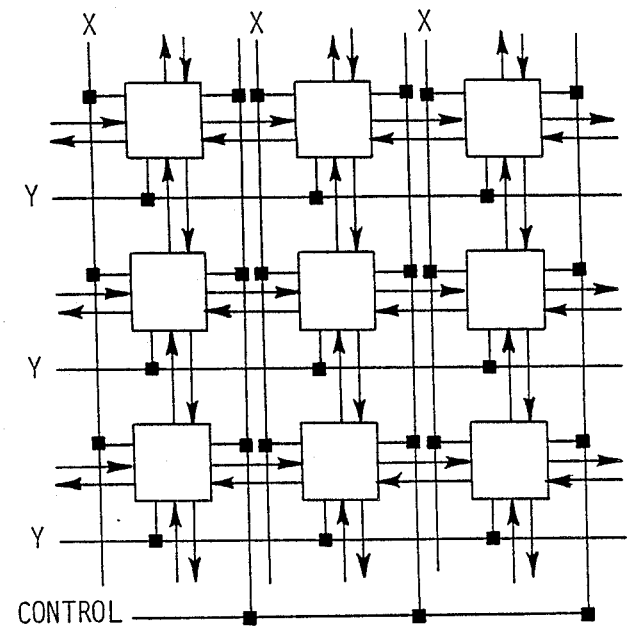
FIG. 5 is a diagram showing the interconnections between the processing elements in the board layout shown in FIG. 4.

In FIGS. 4 and 5 the processing 10 board layout is shown in more detail. A set of address lines 18 are used to address each processing element 12, and are also connected to a set of X,Y drivers/sensors 20. The drivers/sensor 20 can stimulate a given P(x,y) to initiate the electronic ripple. The drivers/sensors 20 can also sense when a given Q(x,y) has received a pulse. Also, a set of sensor 1,2,3, drivers/sensors 22 are connected to the address lines 18 to permit the location of plots (P's) and tracks (Q's) to be determined.

In particular, information indicating the coordinate location of Plots, as well as the coordinate location of tracks is received by the sensor 1,2,3 drivers/sensors 22. In a tracking system with three sensors, for example, this information will originate from the three sensors. The sensor 1,2,3 drivers/sensors 22 will then transmit signals to the individual processing elements 12 which are at positions in the processor 10 corresponding to those points. These signals will cause the processing elements to assume a state by which they may be identified (by the X-Y drivers/sensors 20) as, for example, a first (P) classification or a second (Q) classification.

A circuit controller 24 is connected to the address lines 18 and also to control lines 25 and to the X,Y and the sensor 1,2,3 driver/sensors 20, 22. The circuit controller 24 provides an external view into the state of each processing element 12 so that events such as correlation can be accessed. The circuit controller 24 may also perform the function of synchronizing the transmission of pulses by the processing elements 12. Synchronization is required so that during each cycle, as shown in FIG. 3 all processing elements 12 that are active transmit pulses at the same time. Alternatively, there may be a delay circuit within each processing element 12 that requires the processing element 12 to wait a prescribed period of time before transmitting a pulse. There is also an interface circuit 26 which provides an interface between the processor 10 and external systems. For example, a host processor (not shown) may be used to interpret the data provided by the processor 10.

It should be noted that while the processor 10 can determine which of the Q(x,y)'s are nearest the P(x,y), the circuit controller 24 may also determine the order of receipt of pulses of all Q(x,y)'s to provide a ranking of the relative distance of each Q(x,y) to the P(x,y). In addition, in some cases it may be desirable to have the electronic ripple proceed until other events occur, such as, when the edge of the X-Y plane is reached, when a prescribed length of time has elapsed with no Q(x,y)'s encountered or other temporal/spatial/event-driven conditions occur. Moreover, while the above embodiment shows a case of a single P(x,y) being processed, the processor 10 may also be expanded to process multiple simultaneous P(x,y)'s. Other embodiments contemplated include weighted (fuzzy) correlation where the output of each processing element 12 is a predetermined transfer function of its input. This may provide, for example, a dampened propagation of the electronic ripple. One use of such a feature is to reduce the interference between two simultaneously propagating ripples.

In addition, alternate interconnect structures, for example, a two-dimensional hexagonal array, may be employed. Dynamically reconfigurable interconnect structures are also possible. It may further be desirable to have alternate conditions for each processing element 12 to transmit a pulse. For example, it may be required that some combination of inputs receive pulses in order for a given processing element to transmit. Multi-dimensional (greater than two-dimensional) fuzzy correlation may be accomplished by configuration an arbitrary number of processors 10 in parallel and/or reconfiguring the interconnect patterns of selected processors 10. For example, a plurality of layers of processor 10 may be connected so that neighboring processing elements form a three-dimensional cube. It will also be appreciated that the present invention may be implemented using electrical devices such as programmable logic devices, or some combination of optical and electrical devices.

The present invention provides a wavefront vector correlation processor 10 that can perform high speed vector-to-vector correlation at low cost. It is estimated that in one embodiment of the wavefront vector correlation processor 10 with a two-dimensional space of 1,024×1,024 processing elements 12 and using a cycle time of 10 nanoseconds, the weighted correlation distances from a given vector P (x,y) to 100,000 target vectors distributed uniformly in the space may be computed in, on average, approximately 1 millisecond. (Cycle time is defined as the time between successive simultaneous transmission of pulses from processing elements 12) Of the 1 millisecond only 15 microseconds are required for actual processing; the rest is I/O dependent and directly proportional to the number of target vectors. Overall, this is estimated to be 1,500 times faster than an equivalent software solution implemented on a typical mini-computer.

Those skilled in the art can appreciate that other advantages can be obtained from the use of this invention and that modification can be made without departing from the true spirit of the invention after studying the specification, drawings and following claims.

What is claimed is:

1. In a processor having an array of similar processing elements, each processing element connected to neighboring processing elements, and capable of responding to an input pulse with an output pulse, the improvement comprising:
    said processing elements being disposed in said array in positions that represent vectors in a vector space;
    memory means within each processing element for storing a classification;
    logic means within each processing element for transmitting a single pulse to each of said connected neighboring processing elements upon receipt of a pulse;
    address means connected to each of said processing elements for permitting addressing of said processing elements;
    controller means connected to said address means for transmitting signals to selected processing elements, said signals including classifying signals for assigning classifications to said selected processing elements;
    said controller means also capable of transmitting a pulse to one or more selected cells having a first classification; and
    detection means for detecting when processing elements of a second classification receive pulses from one or more neighboring processing elements, wherein the time between transmission of a pulse from said processing element having a first classification and the receipt of said pulse by a processing element of a second classification provides a vector-to-vector correlation between the two processing elements.

2. The process of claim 1 further comprising a synchronization means connected to said address means for synchronizing the timing of the transmission of said output signals by said processing units.

3. The processor of claim 1 wherein said processing elements are arranged in two-dimensional columns and rows and are connected to the four nearest processing elements.

4. The processor of claim 1 wherein said pulses are electronic pulses.

5. The processor of claim 1 wherein said vector-to-vector correlation is a function of the spatial distance between processing elements.

6. The process of claim 1 wherein said processing elements further comprise a transfer function means so that said processing elements transmit a single pulse that is a weighted transformation of the received pulse.

7. The process of claim 1 wherein said processing elements further comprise a delay means so that said processing elements transmit a single pulse upon receipt of an input pulse and will not transmit any additional pulses until after a predetermined period of time has elapsed.

8. The processor of claim 1 further comprising a plurality of identical processors each interconnected so that said processing elements are each connected to neighboring processing elements that form a cube around said processing element.

9. A processor for correlating at least one vector having a first classification with a second set of vectors having a second classification comprising:
    an array of similar processing elements, each processing element connected to neighboring processing elements and capable of responding to a input pulse with an output pulse;
    said processing elements being disposed in said array in positions that represent vectors in a vector space;
    memory means within each processing element for storing a classification;
    logic means within each processing element for transmitting a single pulse to each of said connected neighboring elements upon receipt of a pulse;
    address means connected to each of said processing elements for permitting addressing of said processing elements;
    controller means connected to said address means for transmitting signals to selected processing elements, said signals including classifying signals for assigning classifications to said selected processing elements;
    said controller means also capable of transmitting a pulse to one or more selected cells having a first classification; and
    detection means for detecting when processing elements of a second classification receive pulses from one or more neighboring processing elements, wherein the time between the transmission of a pulse from said processing element having a first classification and the receipt of said pulse by a processing element having said second classification provides a vector-to-vector correlation between the two processing elements.

10. The processor of claim 9 further comprising a synchronization means connected to said address means for synchronizing the timing of the transmission of said output signals by said processing units.

11. The processor of claim 9 wherein said processing elements are arranged in two-dimensional columns and rows and are connected to the four nearest processing elements.

12. The processor of claim 9 wherein said pulses are electronic pulses.

13. The processor of claim 9 wherein said vector-to-vector correlation is a function of the spatial distance between processing elements.

14. The processor of claim 9 wherein said processing elements further comprise a transfer function means so that said processing elements transmit a single pulse that is a weighted transformation of the received pulse.

15. The processor of claim 9 wherein said processing elements further comprise a delay means so that said processing elements transmit a single pulse upon receipt of an input pulse and will not transmit any additional pulses until after a predetermined period of time has elapsed.

16. The process of claim 9 further comprising a plurality of identical processor each interconnected so that said processing elements are each connected to neighboring processing elements that form a cube around said processing element.

17. A method for correlating at least one vector having a first classification with a set of vectors having a second classification, said method comprising:
disposing similar processing elements in an array in positions that represent vectors in a vector space, each processing element being connected to neighboring processing elements and capable of responding to an input pulse with an output pulse;
storing a first or a second classification in selected ones of processing elements;
transmitting an input pulse to one of said processing elements having a first classification;
detecting when processing elements having a second classification receive pulses from one or more neighboring processing elements; and
measuring the time between the transmission of the pulse to the processing element in the first classification until the measured receipt of a pulse by the processing element in the second classification, whereby a vector-to-vector correlation between two processing elements is provided.

* * * * *